July 11, 1944.  A. B. CARPMAIL  2,353,125
APPARATUS FOR CLEANING PIPE
Filed Sept. 19, 1941  3 Sheets-Sheet 3

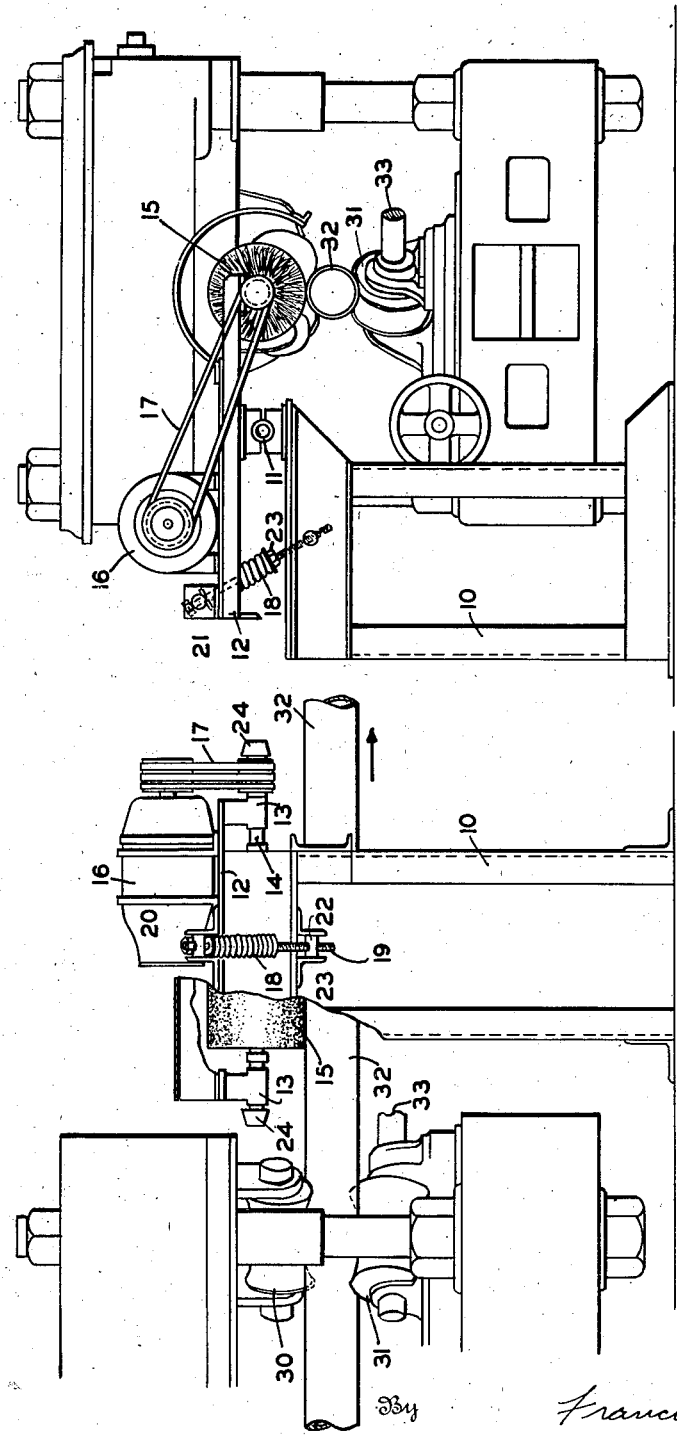

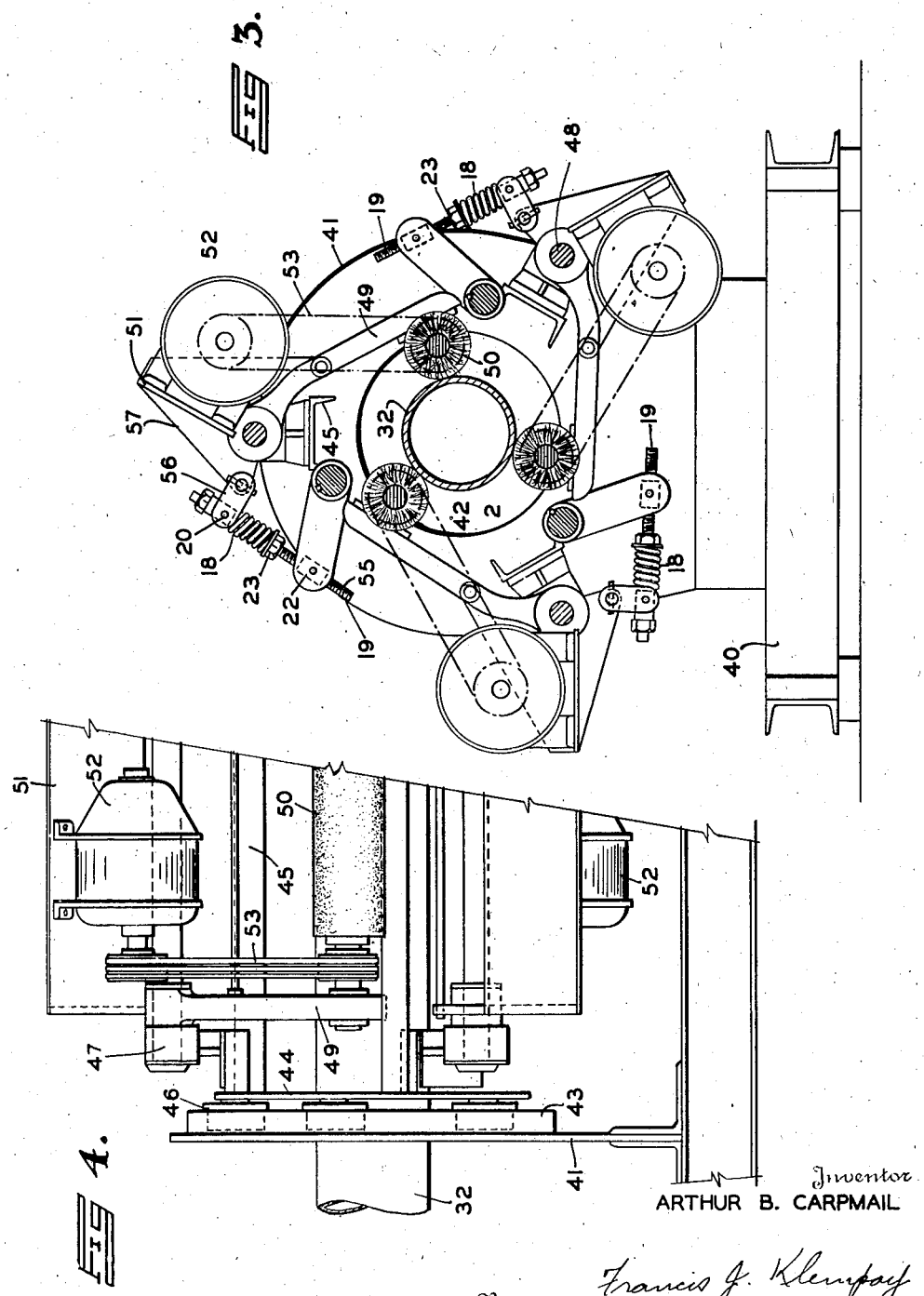

Inventor
ARTHUR B. CARPMAIL
By Francis J. Klempay
Attorney

Patented July 11, 1944

2,353,125

UNITED STATES PATENT OFFICE 2,353,125

APPARATUS FOR CLEANING PIPE

Arthur B. Carpmail, Lorain, Ohio

Application September 19, 1941, Serial No. 411,534

8 Claims. (Cl. 15—88)

This invention relates to apparatus for removing scale corrosion and other foreign matter from the exterior surface of pipe preparatory to coating and/or wrapping of the same. The invention has as its primary object the substantial simplification of the design and construction of devices heretofore employed for accomplishing the stated function on a commercial scale whereby the apparatus employed may be more economically constructed and operated and more readily maintained in operative condition. This principal object is accomplished by the present invention without sacrificing the productive speed heretofore attained and, in fact, the utilization of devices constructed according to the present invention enables such productive speeds to be increased.

The above general and specific objects are accomplished in accordance with the invention by employing one or more motor driven brushing units which are pivotally mounted about an axis or axes extending generally parallel with the principal axis of the pipe being cleaned. In addition, means is provided to urge said unit or units to rotation in certain directions whereby the brushes thereof will be held in yieldingly engagement with the outer surface of the pipe and, also, some provision is made whereby relative longitudinal and rotative movement between a pipe and the brushing unit or units is effected. This method of operation may be accomplished in different ways and for the purpose of illustration, two specific methods are specifically disclosed herein.

In the manufacture of pipe, whether by manual or by the more modern continuous methods, it is common practice to first form the pipe, cut the same to the approximate lengths desired and then transfer the lengths onto cooling tables where the stock is allowed to cool down to substantially near atmospheric temperatures. The cooling process results in the formation of scale on the outer surface of the pipe and some distortion in the shape of the pipe due to the internal stresses set up in the metal. When the pipe is cool, it is passed through a straightening machine which consists of a plurality of longitudinally aligned but adjustable passes, each consisting of a pair of upper and lower skewed rolls which are concaved to provide a pass therethrough circular in cross section. The skewed rolls impart both rotation and longitudinal progression to the pipe, as is well understood in the art. From the straightening machine, the pipe may be transferred to a trimming and/or a threading machine or transferred directly to a cleaning machine, preparatory to the coating and/or wrapping of the same. A further object of the present invention is to greatly simplify the apparatus employed for these various operations and to simplify the plant procedure followed in the operation of these machines. Inasmuch as the pipe entering or leaving the straightening machine rotates as it advances longitudinally and since pipe conveyors generally are more desirably constructed with skewed supporting rolls which rotate the pipe while advancing the pipe longitudinaly, it is possible to combine the pipe cleaning apparatus of the invention with such straightening machine or other conveyor and thereby greatly simplify the design and operation of the apparatus required to effect the cleaning phase of the pipe preparation.

The above and other objects and advantages of the invention will become apparent from a consideration of the following detailed specification and the accompanying drawings wherein there is specifically disclosed certain representative embodiments of the principles of the invention.

In the drawings:

Figure 1 is a side view, partly broken away, of a pipe cleaning apparatus constructed in accordance with the principles of the invention and showing the same as being positioned adjacent the stock leaving end of a pipe straightening machine;

Figure 2 is an end view of the apparatus of Figure 1;

Figure 3 is a transverse section through a modified form of pipe cleaning apparatus constructed in accordance with the invention;

Figure 4 is a partial side view of the apparatus of Figure 3; and

Figure 5:
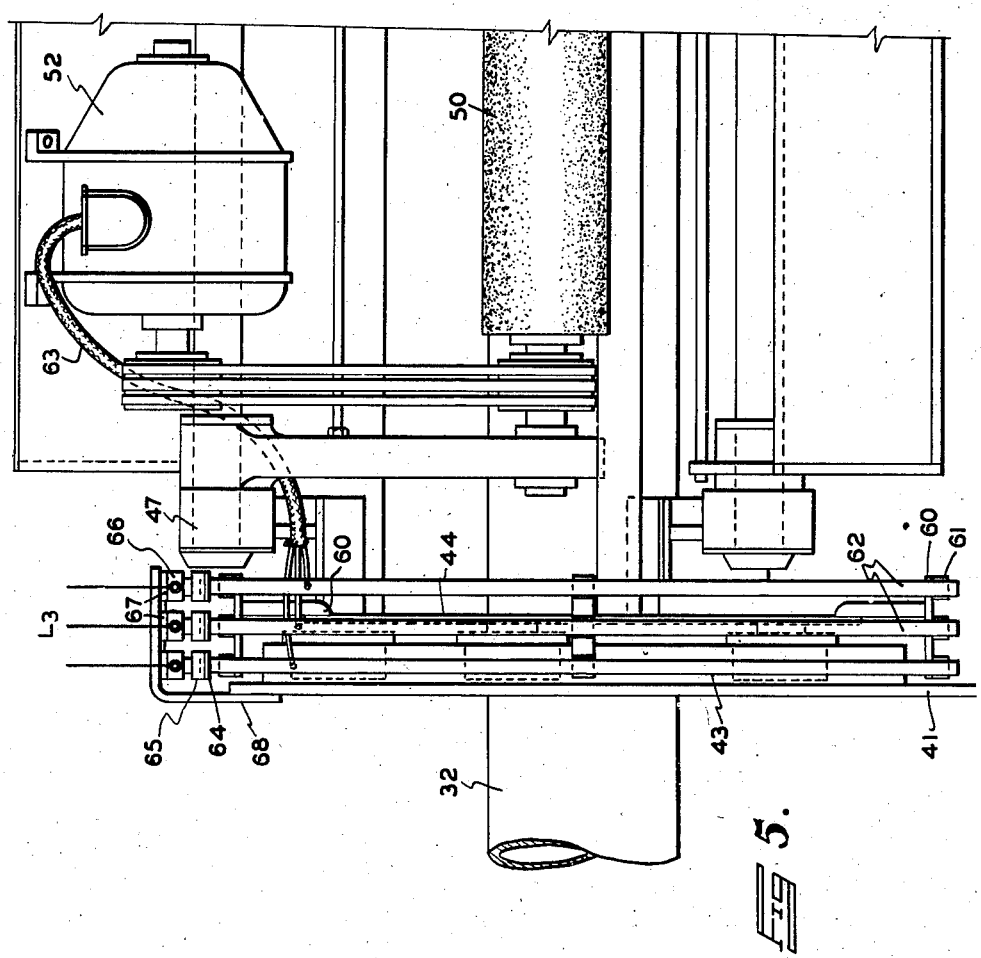
Figure 5 is a detailed view of a portion of the apparatus of Figures 3 and 4, the view showing the preferred arrangement for conducting electric current to the brush driving motors on the revolving carriage.

Referring now to Figures 1 and 2, reference numeral 10 indicates a base or support on which is pivotally mounted at 11 a platform 12 built up of metal sections, two spaced parallel pieces of which extend outwardly to one side of the pivot 11. Journal blocks 13 are secured to the outer ends of these pieces and a shaft 14 carrying a stiff wire brush 15 is journaled in the blocks 13. Shaft 14 is arranged to be driven by an electric motor 16 which is mounted on the platform 12 on the side of the pivot 11 opposite the brush 15. The drive may be accomplished in any suitable manner but preferably a plurality of flexible belts 17 are employed, which belts are entrained over grooved pulleys keyed to the motor shaft and to the shaft 14. It should be observed that the weight of the motor 16 provides an effective counterbalance for the revolving brush assembly mounted on the outer end of the platform 12.

To provide means for yieldingly urging the revolving brush 15 into engagement with the pipe, a coil spring 18 is employed, which spring is carried on a threaded rod 19. Rod 19 passes loosely through a member 20 pivotally mounted between the lugs 21 secured to the platform 12 and has its outer end screw-threadedly received in a member 22 pivoted between the lugs 23 attached to the base 10. A nut 23 is screw-threaded on rod 19 intermediate members 20 and 22 and the spring 18 is held under compression between the member 20 and the nut 23. By rotating rod 19, the platform 12 is caused to rotate about the pivot 11 to move the brush 15 toward and away from the longitudinal axis of the pipe without changing the degree of compression or adjustment of the spring 18. This provides a readily manipulatable arrangement for setting up the machine to clean pipe of different diameters. The extreme outer ends of the shaft 14 are each provided with conically-shaped guards 24 to prevent the ends of the pipe from damaging the bearings 15 or the pulley on shaft 14 in the event that these parts are left in the path of travel of the pipe.

The motor driven cleaning brush unit described above is capable of wide application and may be used in any situation where means is provided to support the pipe and to simultaneously impart rotational and longitudinal movement to the pipe. As explained above, these conditions are inherent in many pipe conveying devices now employed and the desired cleaning may be effected by properly positioning the said unit in relation to the path of travel of the pipe along the conveyor. For this purpose the base 10 and the platform 12 may be made adjustable, or these parts may be specially constructed for each particular installation. Figures 1 and 2 illustrate a representative use of the apparatus and in these figures, reference numerals 30 and 31 represent the upper and lower straightening rolls in the last stand of a conventional pipe straightening machine. As shown, these rolls are concaved and oppositely skewed and it should be apparent that as the rolls rotate, the pipe 32 fastened therebetween will be caused to rotate as it moves longitudinally. The lower roll 31 is arranged to be driven by a shaft 33 from suitable driving means, not shown, and in practice, three or more similar sets of rolls arranged in longitudinal alignment are employed to straighten the pipe as it passes through the machine. Inasmuch as the construction of the straightening machine per se forms no part of the invention, the same is not shown in detail.

In operation, as the pipe 32 issues from the straightening machine or passes along in a conveyor as explained above, its outer surface is engaged by the rapidly revolving wire brush 15 which, being driven at high speeds, is operative to remove all scale corrosion and other foreign matter from the surface of the pipe. Since the pipe rotates about its principal axis, all portions of the outer surface of the same will be subjected to the action of the revolving brush thereby insuring that all the outer surface will be cleaned. It should be observed that the brush 15 is of substantial length which is greater than the pitch of the spiral path imparted to the pipe by the conveyors and machines mentioned herein. This eliminates the possibility of leaving any spiral portion of the pipe uncleaned.

In the event that it is desired to employ the motor driven cleaning brush unit of the invention independently of any conveyor or other apparatus which does not rotate the pipe, an arrangement as disclosed in Figures 3 and 4 may be utilized. This apparatus consists of a base 40 having two upwardly extending spaced supports 41, each provided with a central aperture 42 and a circular track 43 extending about the periphery of the aperture 42. The carriage, consisting principally of end rings 44 and circumferentially spaced interconnecting struts 45, is revolvably mounted on the tracks 43, being supported by the flanged wheels 46. Secured to each of the struts 45, which are preferably channel shaped and three in number as indicated in Figure 3, is a pair of pillow blocks 47 in which is journaled a shaft 48 extending generally parallel with the axis of rotation of the carriage. A motor driven brush unit, substantially identical in principle and operation to the unit of Figures 1 and 2, is pivotally mounted on each of the shafts 48 and consists of two spaced inwardly directed arms 49 which rotatably support a wire brush 50 at their inner ends. The outer ends of the arms are rigidly interconnected by a plate 51 on which is mounted an electric motor 52 coupled with brush 50 by means of the flexible belts 53 which are entrained over grooved pulleys keyed on the motor shaft and on the brush shaft, respectively. In operation, the pipe 32 is supported outside of the cleaning machine proper by suitable means, not shown, in such manner that the longitudinal axis of the pipe coincides with the axis of rotation of the carriage as indicated in Figure 3 and, in addition, the support is such that the pipe may be moved longitudinally through the machine. The carriage is rotated by any suitable expedient, as for example, a motor driven belt, not shown. Motors 52 are energized to revolve the brushes 50 at high speeds and it should be apparent that rotation of the brushes 50 about their own axes, as well as about the axis of the pipe, will thoroughly clean the outer surface of the pipe as the pipe is moved longitudinally through the machine. Current is supplied to the motors 52 through any suitable connecting arrangement, as for example, conducting rings on the carriage cooperating with brushes on the fixed support.

Referring to Figure 5, a plurality of circumferentially spaced brackets 60 are secured to the ring 44 of the revolving carriage structure and overlying the outer surfaces of the brackets 60 are the insulating blocks 61. It will be understood that the blocks 61 are suitably secured to the brackets 60 and secured in turn to the blocks 61 are the current conducting rings 62. Extending from the housing of each of the motors 52 is an armored cable 63 bearing three conductors each of which is connected to one of the rings 62. The rings 62 are arranged to receive current from brushes 64 which are supported in holders 65 which, in accordance with usual practice, are provided with means to resiliently urge the brushes into engagement with the rings. Electrical connection is made between a 3-phase power line L3 and the holders and/or brushes through terminal members 66. Terminals 66 and holders 65 are carried on an insulating plate 67 which in turn is secured to a bracket 68 fastened to a stationary part of the machine as, for example, the support 41 as shown.

Each of the motor driven brushing units of the apparatus of Figures 3 and 4 is provided with means to adjust the inner position of the brush and to apply yielding pressure between the brush and the pipe which is substantially identical with the corresponding means 18—23 of the apparatus of Figures 1 and 2. In the device of Figures 3 and 4, the member 22 is pivoted between lugs 55 which are rigidly supported on the carriage and the member 20 is pivoted between the lugs 56 which are rigidly mounted on an extension 57 of the plate 51. It should be apparent that rotation of the rods 19 adjusts the brushes 50 inwardly or outwardly without altering the compression setting of the springs 18, while rotation of the nuts 23 relative to the rolls 19 varies the compression of the springs and, therefore, the stiffness of the yielding engagement between the brushes and the pipe.

It should now be apparent that I have provided an improved apparatus for cleaning the exterior surface of pipe, which accomplishes the objects initially set out. The apparatus is simple and economical in construction and operation and simplifies plant procedure and layout because of its wide adaptability. The direct coupled motor driven brushing units are highly efficient in operation and require little or no maintenance. Moreover, their construction facilitates their installation, either in a fixed or a revolving system since the weight of the motor counterbalances the weight of the brush and shaft both statically and dynamically. It should therefore be understood that the above specifically described embodiments of the invention should be considered as illustrative only as many changes may be made therein without departing from the spirit or scope of the invention. Reference should therefore be had to the appended claims in determining the scope of the invention.

What I claim is:

1. In combination with means to support succeeding lengths of pipe including means engaging opposite sides of said pipe to simultaneously rotate the same about their principal axes and move the same longitudinally in succession, of an apparatus positioned adjacent said engaging means and being operative to clean the exterior surface of said pipe, said apparatus comprising a pivotally mounted support carrying an electric motor on one side of the pivotal axis and a revolving brush on the other side of the pivotal axis, means interconnecting said motor and brush whereby said brush will be motor driven, means to resiliently urge said support to rotation in one direction whereby said brush will be maintained in yielding engagement with said surface, said brush adapted to rotate about an axis substantially parallel with said pivotal axis and the principal axis of said pipe and having a length at least equal to the pitch of the spiral path taken by said pipe.

2. In combination with a stand of oppositely skewed rolls which are operative to engage the pipe on opposite sides thereof and rotate the same while advancing the same longitudinally, of an apparatus to clean the exterior surface of said pipe as the same enters or leaves said stand, said apparatus comprising a base, a support pivotally mounted on said base, a motor on said support on one side of the pivotal axis and a revolving brush connected with said motor and mounted on the opposite side of said pivotal axis, means to resiliently urge said support to rotation in one direction whereby said brush will maintain yielding contact with said surface, said brush adapted to rotate about an axis substantially parallel with the principal axis of said pipe and having a length at least equal to the pitch of the spiral path imparted to said pipe by said machine.

3. An apparatus for cleaning the exterior surface of pipe comprising in combination a base, a support pivotally mounted on said base and carrying a revolvable brush on one side of the pivotal axis, an electric motor mounted on said support on the opposite side of said pivotal axis thereby providing a counterweight for said brush, a conically-shaped guard at one end of said brush, and a driving connection between said motor and brush whereby the latter is motor driven.

4. An apparatus for cleaning the exterior surface of pipe comprising in combination a carriage adapted to rotate about the principal axis of the pipe and through which the pipe is adapted to be moved longitudinally, a support mounted on said carriage for pivotal movement about an axis extending generally parallel with the axis of rotation of said carriage, a brush revolvably mounted on said support on one side of said pivotal axis and an electric motor mounted on said support on the opposite side of said pivotal axis, means to urge said support to rotate in one direction about said pivotal axis whereby said brush will be maintained in yielding engagement with said surface, and a driving connection between said motor and brush.

5. An apparatus for cleaning the exterior surface of pipe comprising in combination a carriage mounted for rotation about the longitudinal axis of said pipe and through which said pipe is adapted to be moved longitudinally, a support carried by said carriage and mounting a motor and a brush, said brush adapted to engage said surface and to be rotated by said motor about an axis substantially parallel with the axis of rotation of said carriage, and a movable connection between said carriage and support whereby said brush may be maintained in yielding engagement with said surface.

6. Apparatus according to claim 5 further including means to conduct electric current to said motor during rotation of said carriage, said means comprising a current conducting ring secured to and rotatable with said carriage, a base rotatably supporting said carriage, and a normally fixed current conducting brush mounted on said base and having pressure contact with said ring.

7. An apparatus for cleaning the exterior surfaces of elongated objects in succession as the objects advance longitudinally in a common path comprising a revolvable brush mounted for rotation about an axis substantially parallel with the direction of said path, means to rotate said brush, a conically-shaped guard at one end of said brush, and means to urge said brush into engagement with said objects.

8. In apparatus for cleaning the exterior surface of pipe the combination of a supporting member, a support pivotally mounted intermediate its end on said member for pivotal movement about an axis generally parallel with the longitudinal axis of the pipe to be cleaned, a revolvable brush carried by one end of said support and adapted to be maintained in contact with said pipe, a motor mounted on the other end of said support and having driving connection with said brush; and means to rotate said support about its pivot and to vary the pressure exerted by said brush on said pipe comprising a lug secured to said support, a second lug secured to said supporting member, a headed bolt slideably received in said first mentioned lug and screw-threadedly received in said second lug, a threaded nut on said bolt intermediate said lugs, and a coil spring encircling said bolt intermediate said first mentioned lug and said nut, the arrangement being such that by rotation of said bolt the distance between said lugs may be varied without changing the degree of compression of said spring.

ARTHUR B. CARPMAIL.